US006806673B2

United States Patent
Ho

(10) Patent No.: US 6,806,673 B2
(45) Date of Patent: Oct. 19, 2004

(54) FAN DRIVING CIRCUIT USING A PWM INPUT SIGNAL

(75) Inventor: Tsung-Te Ho, Putz (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/609,581

(22) Filed: Jul. 1, 2003

(65) Prior Publication Data

US 2004/0164699 A1 Aug. 26, 2004

(51) Int. Cl.⁷ .............................................. G05B 11/28
(52) U.S. Cl. .................... 318/559; 318/560; 318/811; 388/804
(58) Field of Search ................................ 318/599, 560, 318/811; 388/804, 829, 809, 920

(56) References Cited

U.S. PATENT DOCUMENTS

| 5,099,408 | A | * | 3/1992 | Chen et al. ................... 363/41 |
| 5,727,928 | A | | 3/1998 | Brown |
| 5,942,866 | A | * | 8/1999 | Hsieh ........................... 318/268 |
| 6,091,216 | A | * | 7/2000 | Takahashi et al. ............ 318/254 |
| 6,262,549 | B1 | | 7/2001 | Yang et al. |
| 2003/0053323 | A1 | * | 3/2003 | Kimura et al. ................ 363/98 |

FOREIGN PATENT DOCUMENTS

TW 507973 1/1990

* cited by examiner

Primary Examiner—Karen Masih
(74) Attorney, Agent, or Firm—Troxell Law Office PLLC

(57) ABSTRACT

The present invention provides a fan driving circuit using a pulse width modulation (PWM) input signal. Wherein, a signal generator electrically connects to a fan motor and provides power for the fan motor. The signal generator generates a control signal for controlling ON/OFF of the power. Wherein, the signal generator generates a control signal at a buffer period when the fan motor changes phase for controlling phase change. Whereby, by means of the control signal at the buffer period, when phase changes, power-consuming would be reduced. The fan motor can change phase successfully and operate efficiently for power-saving, capacity-improving and cost-reducing.

1 Claim, 8 Drawing Sheets

FAN DRIVING CIRCUIT USING A PWM INPUT SIGNAL

REFERENCE CITED

1. Taiwan Patent No. 507973.
2. U.S. Pat. No. 6,262,549.
3. U.S. Pat. No. 5,942,866.
4. U.S. Pat. No. 5,727,928.

FIELD OF THE INVENTION

The present invention relates to a fan driving circuit using a Pulse Wide Modulation (PWM) signal. More particularly, by means of a control signal at a buffer period, when phase changes, power-consuming would be reduced. The fan motor can change phase successfully and operate efficiently for power-saving, capacity-improving and cost-reducing.

BACKGROUND OF THE INVENTION

A control circuit for heat-dissipation system in Taiwan Patent No. 507973 discloses a conventional fan control circuit using a PWM signal. The control circuit includes a signal generator electronically connecting to the heat-dissipation system, providing power of the heat-dissipation system and generating a control signal to control the ON/OFF of the power; and, a power regular apparatus, electronically connecting between the heat-dissipation system and power, paralleling to the signal generator, provides constantly basic power for the circuit of the heat-dissipation system to prevent signals outputting from external devices electronically connecting to the heat-dissipation system from being interfered by the control signal.

Although the fan driving circuit using a PWM signal mentioned above can prevent signals outputting from external devices electronically connecting to the heat-dissipation system from being interfered by the control signal, it is insufficient for the control circuit in real practice. Fan motor must change phase first when operating. The output wave diagrams of phase change when fan motor uses the above control circuit or other conventional control circuits are shown in FIG. 7 and FIG. 8. As shown in the above diagrams, the waves when the fan motor changes phase is successive. Therefore, conventional fan driving circuit using a PWM signal tends to power-consuming increasing by fan motor changing phase. Since the required power for the fan increases, it is impossible to save power and operate the fan efficiently. That is, when changes phase, the fan motor is unable to change phase successfully, resulting in low efficiency.

SUMMARY OF THE INVENTION

The main objective of the present invention is that when phase changes, by means of a control signal at a buffer period, power-consuming would be reduced. The fan motor can change phase successfully and operate efficiently for power-saving, capacity-improving and cost-reducing.

To achieve the above objective, the present invention provides a fan driving circuit using a pulse width modulation (PWM) signal. Wherein, a signal generator electronically connects to a fan motor and provides power for the fan motor. The signal generator generates a control signal for controlling ON/OFF of the power. Wherein, the signal generator generates a control signal at a buffer period when the fan motor changes phase for controlling phase change. Therefore, when phase changes, by means of a control signal at a buffer period, power-consuming would be reduced. The fan motor can change phase successfully and operate efficiently for power-saving, capacity-improving and cost-reducing.

BRIEF DESCRIPTION OF THE DRAWINGS

The present invention will be better understood from the following detailed description of preferred embodiments of the invention, take in conjunction with the accompanying drawings, in which.

DETAILED DESCRIPTION OF THE INVENTION

The following descriptions of the preferred embodiments are provided to understand th features and the structures of the present invention.

Figure 1:
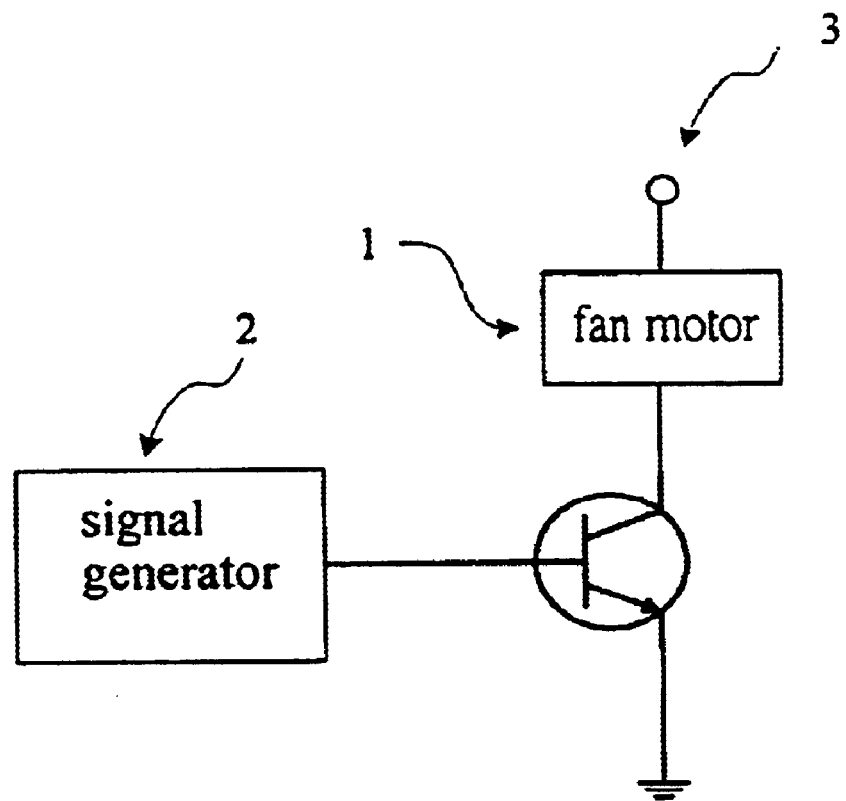
FIG. 1 shows a control circuit diagram of a signal generator according to a first embodiment of the present invention.
Figure 2:
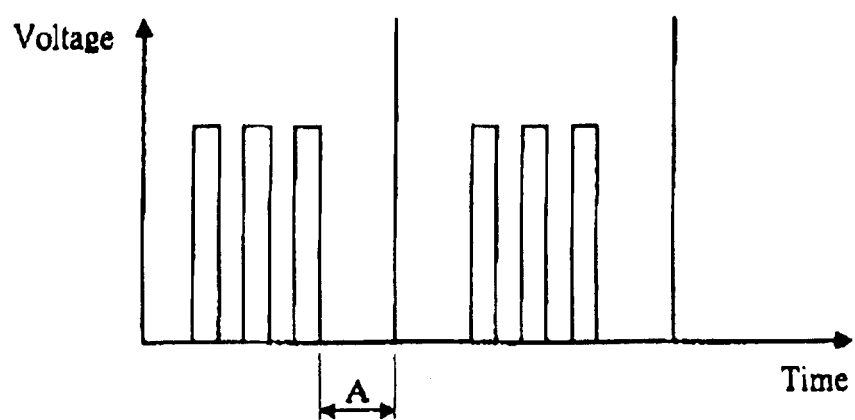
FIG. 2 shows a wave diagram of output signal of the signal generator of the present invention.

FIG. 1 and FIG. 2 respectively show a control circuit diagram of a signal generator according to a first embodiment of the present invention and a wave diagram of output signal of the signal generator of the present invention. As shown in the diagrams, the present invention provides a fan driving circuit using a PWM signal. Wherein, a signal generator generates a control signal at a buffer period when the fan motor changes phase for controlling phase change. Therefore, when phase changes, by means of the control signal at a buffer period, power-consuming would be reduced. The fan motor can change phase successfully and operate efficiently for power-saving, capacity-improving and cost-reducing.

The signal generator 2 mentioned above electronically connects to a fan motor 1 and provides power 3 for the fan motor 1. Wherein, the signal generator 2 generates a control signal for controlling ON/OFF of the power 3. Moreover, the signal generator is a fan driving circuit using a PWM signal. The signal generator 2 generates a control signal at a buffer period A when the fan motor 1 changes phase (as shown in FIG. 2, between two output pulse waves). By the control signal at a buffer period A, generated by the signal generator 2, the signal generator 2 would be able to control the phase change of the fan motor 1. The control signal at the buffer period A of the signal generator 2 has a ratio of wave-width within a range of 5% to 30%. According to the invention described above, a novel fan driving circuit using a PWN signal, when the fan motor 1 changes phase, by means of the control signal at the buffer period A, power-consuming would be reduced. The fan motor 1 can change phase successfully and operate efficiently for power-saving, capacity-improving and cost-reducing.

Figure 3:
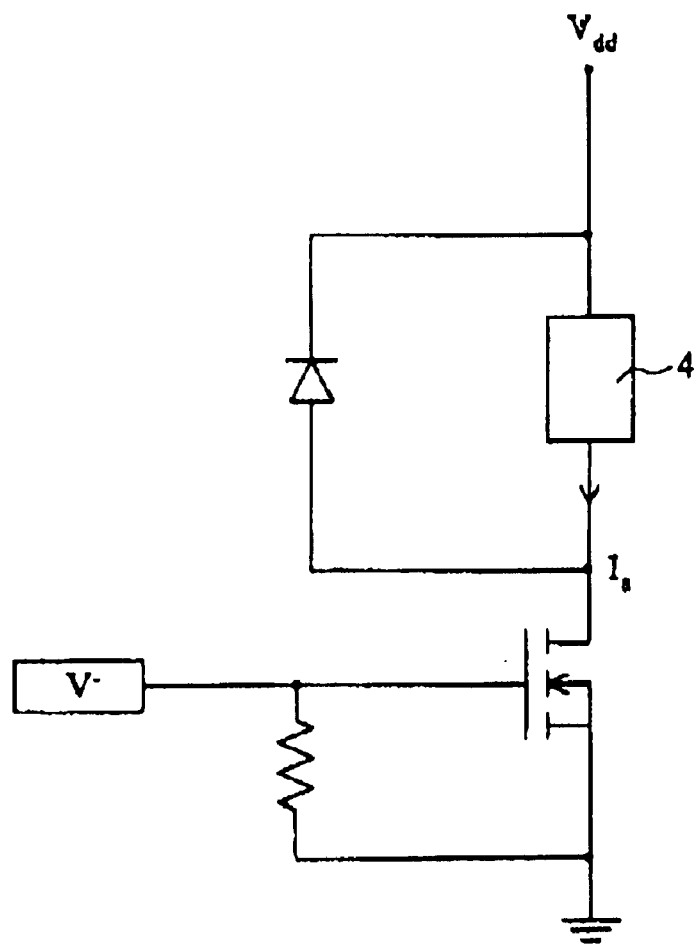
FIG. 3 shows a control circuit diagram according to a second embodiment of the present invention.
Figure 4:
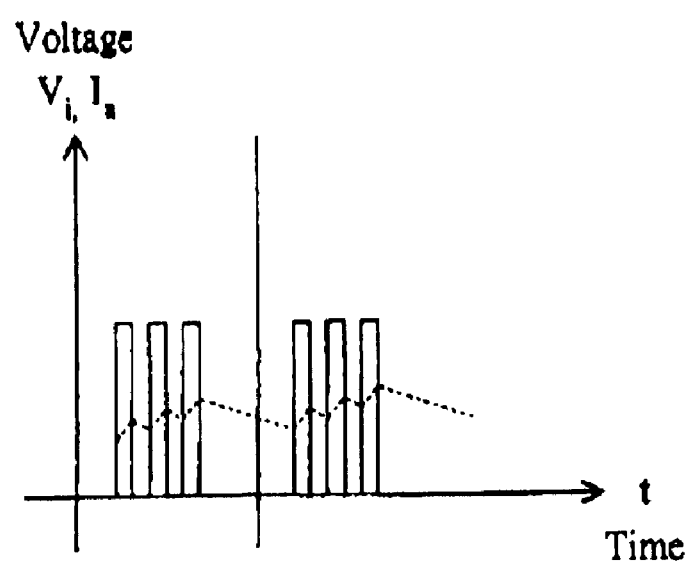
FIG. 4 shows a wave diagram of voltage, armature current and speed according to the second embodiment of the present invention.

FIG. 3 and FIG. 4 respectively show a control circuit diagram according to a second embodiment of the present invention and a wave diagram of voltage, armature current and speed according to the second embodiment of the present invention. As shown in the diagrams, under larger load, transistors will have serious power loss problems. Parts of power will be transferred into heat and be depleted. Since the motor 4 is an inductance load, the current passing through the armature will not drop down to zero immediately when the control voltage $V_i$ of the transistor becomes zero, resulting from the physical characteristic in which current always changes continually. For example, it will reduce constantly along with a specific time constant. Similarly, when $V_i$ suddenly increases, $I_a$ will rise constantly along with a specific time constant, therefore, by inertia of the motor, the motor 4 will not promptly stop or transiently operate. As shown in FIG. 4, the current of the motor 4 can be controlled by directly adjusting the pulse width of the input control voltage to further dominate operation of the motor 4. In addition, the FIG. 4 also shows relation between the duty cycle and speed of the input control pulse. The longer the input voltage pulse is, the faster the operating speed of the motor 4 would be, and vice versa.

Figure 5:
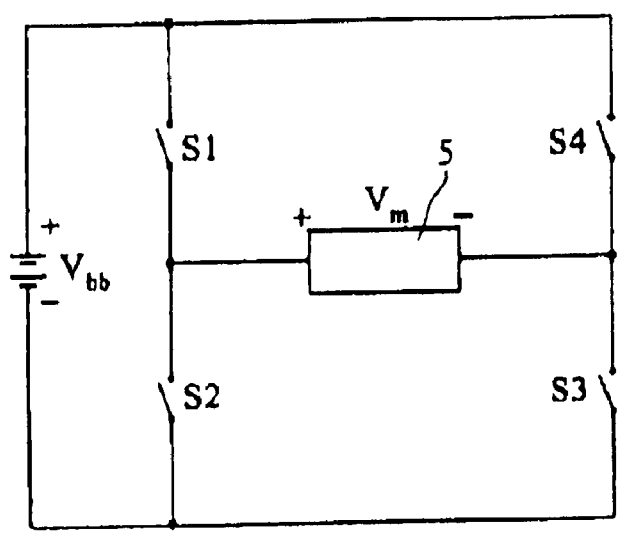
FIG. 5 shows a control circuit diagram according to a third embodiment of the present invention.
Figure 6:
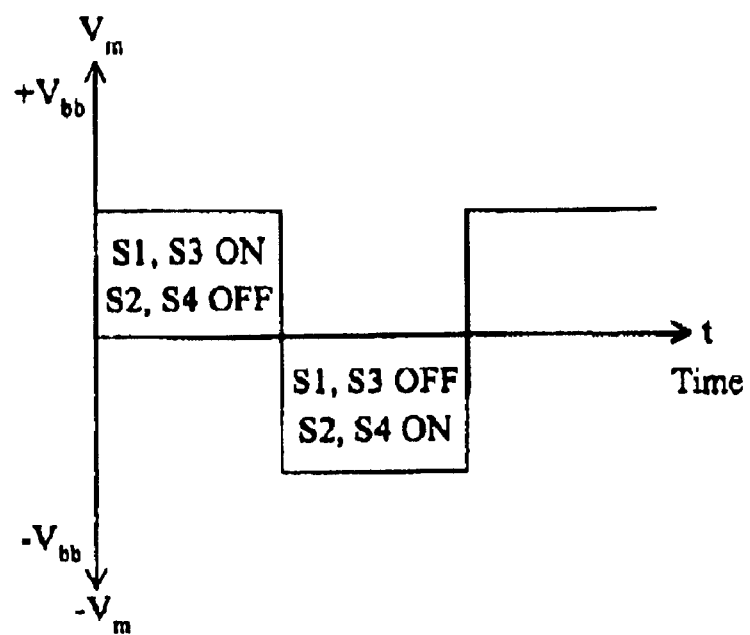
FIG. 6 shows a diagram of basic DC converter and corresponding DC motor terminal voltage of the present invention.
Figure 7:
FIG. 7 shows output wave diagrams of a conventional signal generator.
Figure 8:
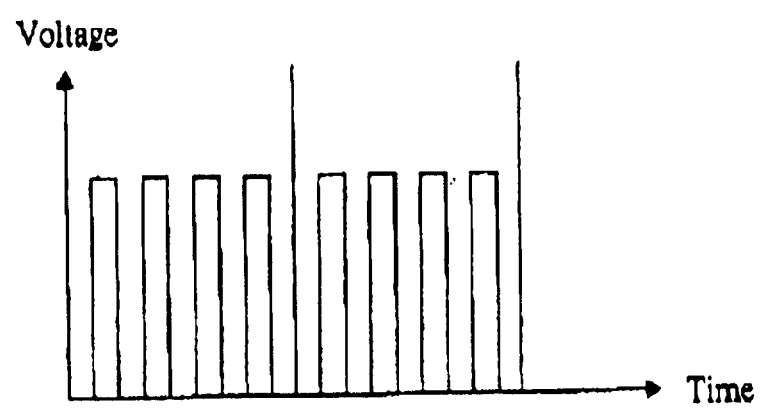
FIG. 8 shows output wave diagrams of a conventional signal generator.

FIG. 5 and FIG. 6 respectively show a control circuit diagram according to a third embodiment of the present invention and a diagram of basic DC converter and corresponding DC motor terminal voltage of the present invention. As shown in the diagrams, to solve the shortcomings of using a relay to control trend, in the third embodiment of the present invention, the basic logic structure is: gathering S1 with S3 into a group, S2 with S4 into another group when switching. The two groups will operate together and become mutual exclusive for preventing occurrence of short circuits. Two rules are described as follows.

(1) The terminal voltage $V_m$ of the motor 5 is equal to $+V_{bb}$ when S1, S3 are ON and S2, S4 are OFF. Meanwhile, the motor 5 operates clock-wise.

(2) The terminal voltage $V_m$ of the motor 5 is equal to $-V_{bb}$ when S1, S3 are OFF and S2, S4 are ON. Meanwhile, the motor 5 operates underclock-wise.

The above control rules cooperating with the fan driving circuit using a PWM signal of the present invention can efficiently control the motor.

In summation of the foregoing section, the invention herein fully complies will all new patent application requirement and is hereby submitted to the patent bureau for review and the granting of the commensurate patent rights. The present invention may be embodied in other specific forms without departing from the spirit of the attributes thereof; therefore, the illustrated embodiment should be considered in all aspects as illustrative and not restrictive, reference being made to the appended claims rather than to the foregoing description to indicate the scope of the invention.

What is claimed is:

1. A fan driving circuit using a PWM input signal for a signal generator electronically connecting to a fan motor and providing power for said fan motor, said signal generator generating a control signal for controlling ON/OFF of said power; which is characterized in that:

said signal generator being a PWM circuit, generating a control signal at a buffer period when said fan motor changing phase for controlling phase change; wherein said buffer period has a ratio wave-width within a range from 5% to 30%.

* * * * *